United States Patent [19]

De Soete

[11] Patent Number: 5,464,599
[45] Date of Patent: Nov. 7, 1995

[54] PROCESS FOR PURIFYING A GAS TO REMOVE NITROGEN MONOXIDE THEREFROM

[75] Inventor: Gérard De Soete, Colombes, France

[73] Assignee: Solvay (Société Anonyme, Brussels, Bulgaria

[21] Appl. No.: 211,082
[22] PCT Filed: Sep. 18, 1992
[86] PCT No.: PCT/EP92/02173
§ 371 Date: Jun. 22, 1994
§ 102(e) Date: Jun. 22, 1994
[87] PCT Pub. No.: WO93/06916
PCT Pub. Date: Apr. 15, 1993

[30] Foreign Application Priority Data

Aug. 30, 1991 [FR] France .................................... 91 12098

[51] Int. Cl.⁶ .................................................. C01B 21/02
[52] U.S. Cl. ................................................... 423/239.1
[58] Field of Search ............................. 423/235, 239.1

[56] References Cited

U.S. PATENT DOCUMENTS 4,141,961 2/1979 Miller ...................................... 423/242
4,588,567 5/1986 Miller ...................................... 423/242
4,839,147 6/1989 Lindbauer et al. ..................... 423/235
5,002,741 3/1991 Hooper ................................... 423/239

FOREIGN PATENT DOCUMENTS 0301272 2/1989 European Pat. Off. ..
0161497 11/1990 European Pat. Off. ..
54-066375 5/1979 Japan .

Primary Examiner—Wayne Langel
Assistant Examiner—Thomas G. Dunn, Jr.
Attorney, Agent, or Firm—Spencer, Frank & Schneider

[57] ABSTRACT

A process for purifying a gas containing nitrogen monoxide to remove nitrogen monoxide therefrom, includes adjusting oxygen content of the gas to provide a quantity of oxygen which is at least equal to a stoichiometric quantity which is necessary in order to oxidize the nitrogen monoxide contained in the gas to nitrogen dioxide; contacting the gas, substantially in the absence of any liquid, with an alkali metal pyrosulphite which is a solid and which is employed in a quantity which is sufficient to convert the nitrogen monoxide contained in the gas to alkali metal nitrite and alkali metal nitrate; and removing the alkali metal nitrite and the alkali metal nitrate from the gas.

13 Claims, 2 Drawing Sheets

PROCESS FOR PURIFYING A GAS TO REMOVE NITROGEN MONOXIDE THEREFROM

BACKGROUND OF THE INVENTION

1. Field of the Invention

The invention relates to the cleaning of gases to remove toxic impurities, in particular to the cleaning of fumes from power stations before they are expelled into the atmosphere.

It relates more particularly to a process for cleaning a gas to remove oxides of nitrogen and, especially, to remove nitrogen monoxide (NO)

2. Description of the Related Art

The fumes generated by the combustion of gaseous, liquid or solid combustible materials are usually contaminated by oxides of nitrogen originating from the nitrogen in atmospheric air and, in some cases, from nitrogen compounds present in the fuel. In these fumes, nitrogen monoxide (NO) constitutes the majority of the oxides of nitrogen, the remainder consisting principally of nitrogen dioxide ($NO_2$).

The high toxicity of nitrogen monoxide and of nitrogen dioxide means that they have to be removed from the fumes before the latter are expelled into the atmosphere.

U.S. Pat. No. 4,839,147 (Waagner Biro AG) proposes a process for cleaning fumes to remove oxides of nitrogen, in which an alkali metal sulphite and ammonia gas are introduced into the fumes so as to reduce the oxides of nitrogen to dinitrogen monoxide ($N_2O$) which is subsequently reduced to nitrogen by the ammonia. In the case of fumes which simultaneously contain oxides of nitrogen and sulphur dioxide, the alkali metal sulphite is formed in situ in the fumes by introducing an alkali metal bicarbonate or carbonate into these fumes.

The disadvantage of this known process is that it requires the use of a number of reagents, including a gaseous reagent (ammonia) whose toxic nature implies considerable safety measures.

SUMMARY OF THE INVENTION

Figure 1:
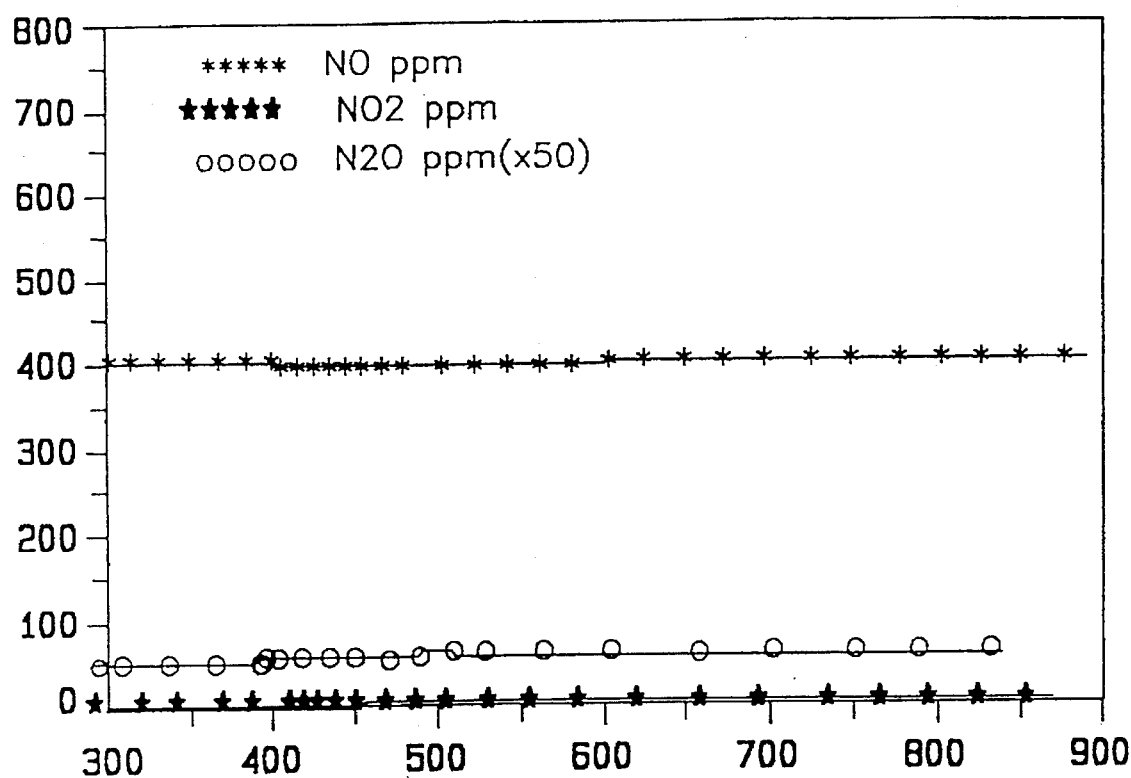
FIGS. 1 and 2 are diagrams indicating the composition of the gases referred to in the Examples.
Figure 1:
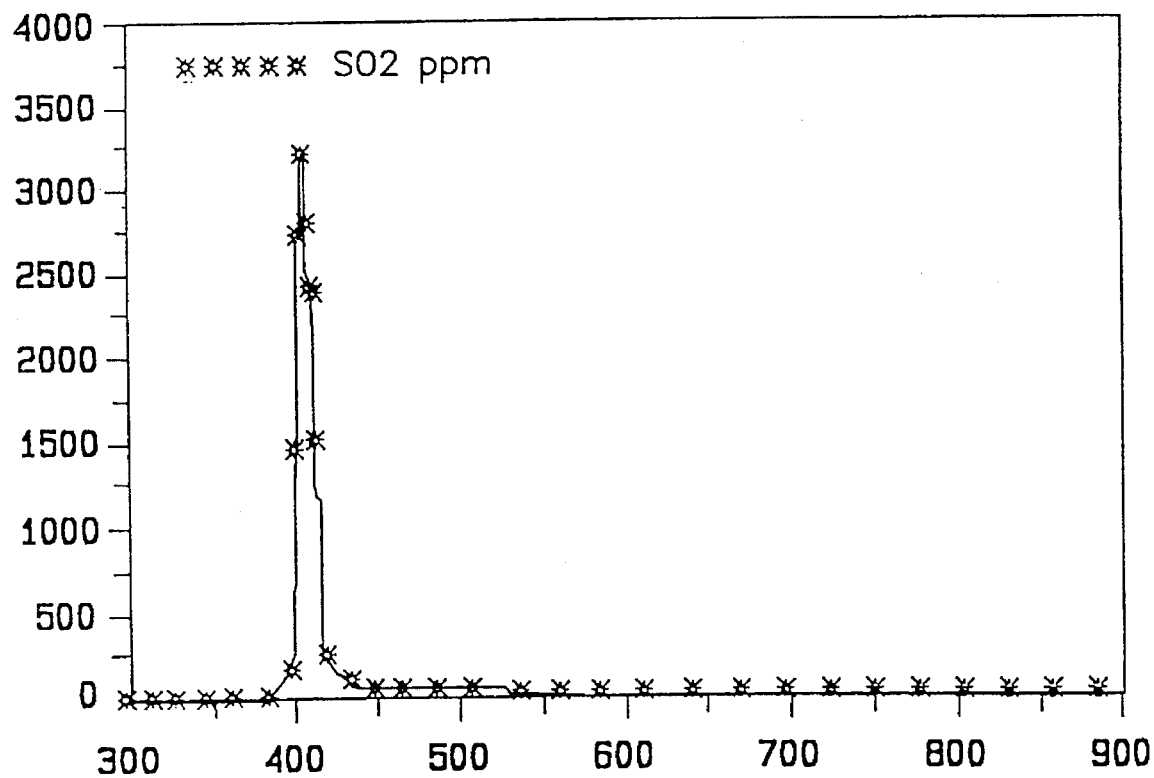

The invention overcomes this disadvantage of the known process described above by providing a new process which makes it possible to carry out efficient cleaning of a gas to remove nitrogen monoxide, without requiring the use of a dangerous gaseous reagent, and which can be carried out at a moderate temperature while giving excellent results.

Consequently, the invention relates to a process for cleaning a gas containing nitrogen monoxide by means of an alkali metal compound, according to which a quantity of oxygen is employed in the gas which is at least equal to the stoichiometric quantity which is necessary in order to oxidize the nitrogen monoxide to nitrogen dioxide, and, for the alkali metal compound, an alkali metal pyrosulphite is selected and is employed in a quantity which is sufficient to convert the nitrogen monoxide in the gas to alkali metal nitrate and nitrite.

In the case where the gas to be treated contains nitrogen monoxide and nitrogen dioxide, a quantity of alkali metal pyrosulphite is preferably used which is at least sufficient to decompose the nitrogen monoxide and the nitrogen dioxide into alkali metal nitrite and alkali metal nitrate.

The invention applies to all gases containing nitrogen monoxide (NO). It applies in particular to the gases generated by the combustion of combustible materials in the presence of air or oxygen. Hereinafter, a gas originating from the combustion of a combustible material will be called "fumes". In the case where the invention applies to fumes, the combustible material is not critical and may be either a gas, a liquid or a solid. It may comprise a fossil fuel (such as petroleum and its derivatives, coal and coke), biomass, or flammable organic or inorganic substances originating, for example, from household or municipal waste. The origin of the fumes is likewise not critical, and they may for example originate from an electricity-producing power station, from a centralized plant for long-distance heating or from a plant for incineration of household or municipal refuse.

The gas treated in the process according to the invention necessarily contains nitrogen monoxide (NO). It may contain other oxides of nitrogen in addition to nitrogen monoxide, for example dinitrogen monoxide ($N_2O$), dinitrogen trioxide ($N_2O_3$), dinitrogen pentoxide and nitrogen dioxide ($NO_2$). Hereinafter, the oxides of nitrogen in the gas will be designated in their entirety by the term $NO_x$. As a general rule, the fraction by volume of nitrogen monoxide (NO) among the entirety of the oxides of nitrogen ($NO_x$) in the gas is at least 50% and is generally greater than 75%; it may be 100%.

As a variant, the gas may contain other compounds, especially oxides of sulphur. Oxides of sulphur, especially sulphur dioxide, are commonly present in the fumes generated by the combustion of sulphur-containing fossil fuels (petroleum and petroleum derivatives, coal, coke).

In accordance with the invention, a quantity of oxygen is employed in the gas which is at least equal to the stoichiometric quantity corresponding to that which would be necessary in order to oxidize the nitrogen monoxide to nitrogen dioxide, according to the reaction:

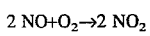

$$2\ NO + O_2 \rightarrow 2\ NO_2$$

Nevertheless, in the process according to the invention, the function of the oxygen is not essentially to oxidize the nitrogen monoxide to nitrogen dioxide, and consequently it coexists with the nitrogen monoxide within the gas, in a quantity which is at least equal to the theoretical, stoichiometric quantity necessary for this oxidization. According to the invention, the molar ratio of $O_2$:NO within the gas must consequently be at least 0.5. In practice, it has proved desirable to bring about within the gas a molar ratio of $O_2$:NO of greater than 1 and preferably of at least 8, values greater than 10 being recommended. Although the process according to the invention sets no upper limit for the content of oxygen in the gas, there is no advantage in exceeding a molar ratio of $O_2$:NO of 100, so as not pointlessly to exaggerate the volume of gas to be treated. Values greater than 15 are generally suitable, with those greater than 25 being preferred. The oxygen may be employed in pure form or, more simply, in the form of ambient air. In the case where the gas treated is fumes, the oxygen may be introduced by an excess of air which is passed to the site where the combustion of the fuel is carried out; it is also possible to introduce air into the fumes downstream of the combustion site.

The function of the alkali metal pyrosulphite is to decompose the nitrogen dioxide and nitrogen monoxide in the gas, forming alkali metal nitrite and alkali metal nitrate according to the following reactions:

$M_2S_2O_5 + 2\ NO_2 \rightarrow MNO_2 + MNO_3 + 2\ SO_2$ $M_2S_2O_5 + 2\ NO + O_2 \rightarrow MNO_2 + MNO_3 + 2\ SO_2$ where M denotes an alkali metal.

The optimum quantity of alkali metal pyrosulphite may easily be determined in each particular case as a function of the composition, temperature and pressure of the gas. In general it should be greater than 0.25 mol, preferably at least 0.4 mol, per mole of nitrogen monoxide in the gas to be cleaned. In the case where the gas to be cleaned contains nitrogen monoxide and nitrogen dioxide, the alkali metal pyrosulphite must be employed in a quantity greater than 0.25 mol, preferably at least 0.4 mol, per mole of nitrogen monoxide and nitrogen dioxide in the gas. In principle, no upper limit is imposed on the quantity of alkali metal pyrosulphite which is used. In practice, given economic considerations, there is no advantage in exceeding 50 mol (preferably 5 mol) of alkali metal pyrosulphite per mole of oxide of nitrogen ($NO_x$) in the gas to be cleaned, values of between 0.4 and 2.5 mol being especially recommended and those of between 0.5 and 2 being the most advantageous.

The gas can be treated with the alkali metal pyrosulphite by a wet route or by a dry route. In treatment by the wet route, the gas is washed with an aqueous solution of alkali metal pyrosulphite. In treatment by the dry route, which is preferred, the alkali metal pyrosulphite is employed in solid form in the gas, in the absence of a liquid, especially water. In treatment by the dry route, various modes of operation can be used. According to a first mode of operation, the alkali metal pyrosulphite is injected in the form of a powder into the gas, inside a reaction chamber. According to a second mode of operation, the gas is circulated in a fixed bed, a moving bed or a fluidized bed of particles of alkali metal pyrosulphite. These modes of operation are well known in the art of chemical engineering. Within these modes there is advantage in using a powder with a regular particle size which is as fine as possible, in order to accelerate the reaction of the alkali metal pyrosulphite with the oxides of nitrogen in the gas. As a general rule, it is recommended to use a powder whose mean particle diameter is less than 250 μm. The preferred particle size corresponds to a mean diameter of the particles which is no greater than 200 μm, for example between 5 and 150 μm.

In the process according to the invention, the treatment of the gas with the alkali metal pyrosulphite must be carried out at a temperature of greater than 250K. and preferably at least 300K. Temperatures of between 300 and 700K. are suitable. Those of between 350 and 600K. are preferred and, among the latter, those of between 450 and 550K. are especially advantageous.

In the process according to the invention, the reaction of the alkali metal pyrosulphite with the oxides of nitrogen in the gas releases sulphur dioxide, which it may be desirable to remove. For this purpose, the treatment with the alkali metal pyrosulphite can be followed by a treatment with alkali metal bicarbonate, carbonate or hydroxide. It is, for example, possible to use the procedure described in the Patent Application EP-A-0 161 497, which consists in treating the gas by a dry route with alkali metal bicarbonate.

In the process according to the invention, the alkali metal pyrosulphite is advantageously sodium pyrosulphite.

In a particular embodiment of the process according to the invention, an alkali metal pyrosulphite is employed which is formed in situ within the gas, by reacting alkali metal bicarbonate with the sulphur dioxide present in the gas according to the following reactions, in which M denotes an alkali metal:

$MHCO_3 + SO_2 \rightarrow MHSO_3 + CO_2$ $2\ MHSO_3 \rightarrow M_2S_2O_5 + H_2O$ In this embodiment of the process, the alkali metal bicarbonate is thus introduced into the gas where it is converted to alkali metal pyrosulphite according to the reactions given above.

This embodiment of the invention implies the presence of sulphur dioxide within the gas in a quantity which is sufficient for the quantity of alkali metal pyrosulphite produced to be at least equal to the stoichiometric quantity which is necessary to react with all of the oxides of nitrogen in the gas. The advantage of this embodiment is that it does not require the use of a dangerous reactive gas in order to remove, on the one hand, the sulphur dioxide and the oxides of nitrogen $NO_x$ from the gas and, on the other hand, the sulphur dioxide which is generated by the reaction of the alkali metal pyrosulphite with the oxides of nitrogen. It finds an advantageous application in the treatment of the fumes generated by the combustion of fossil fuels, which contain nitrogen derivatives and sulphur derivatives.

The process according to the invention leads to the formation of a solid residue of alkali metal nitrite, alkali metal nitrate and alkali metal sulphate. This residue can easily be removed by treating the gas in a suitable dust-removal device which may, for example, comprise an electrostatic filter. In the case of treatment by a dry route according to the definition thereof which was given above, it is possible to use a filter comprising filter cloths (bag filter) of optimum efficiency.

The process according to the invention is applied to the cleaning of all gases which contain oxides of nitrogen $NO_x$. It finds an advantageous application in the cleaning of the fumes originating from the incineration of household or municipal refuse, as well as in the cleaning of fumes originating from the combustion of fossil fuels such as natural gas, coal and petroleum derivatives. It is applied in particular to the cleaning of the fumes originating from electricity-producing power stations.

DESCRIPTION OF THE PREFERRED EMBODIMENTS

Figure 2:
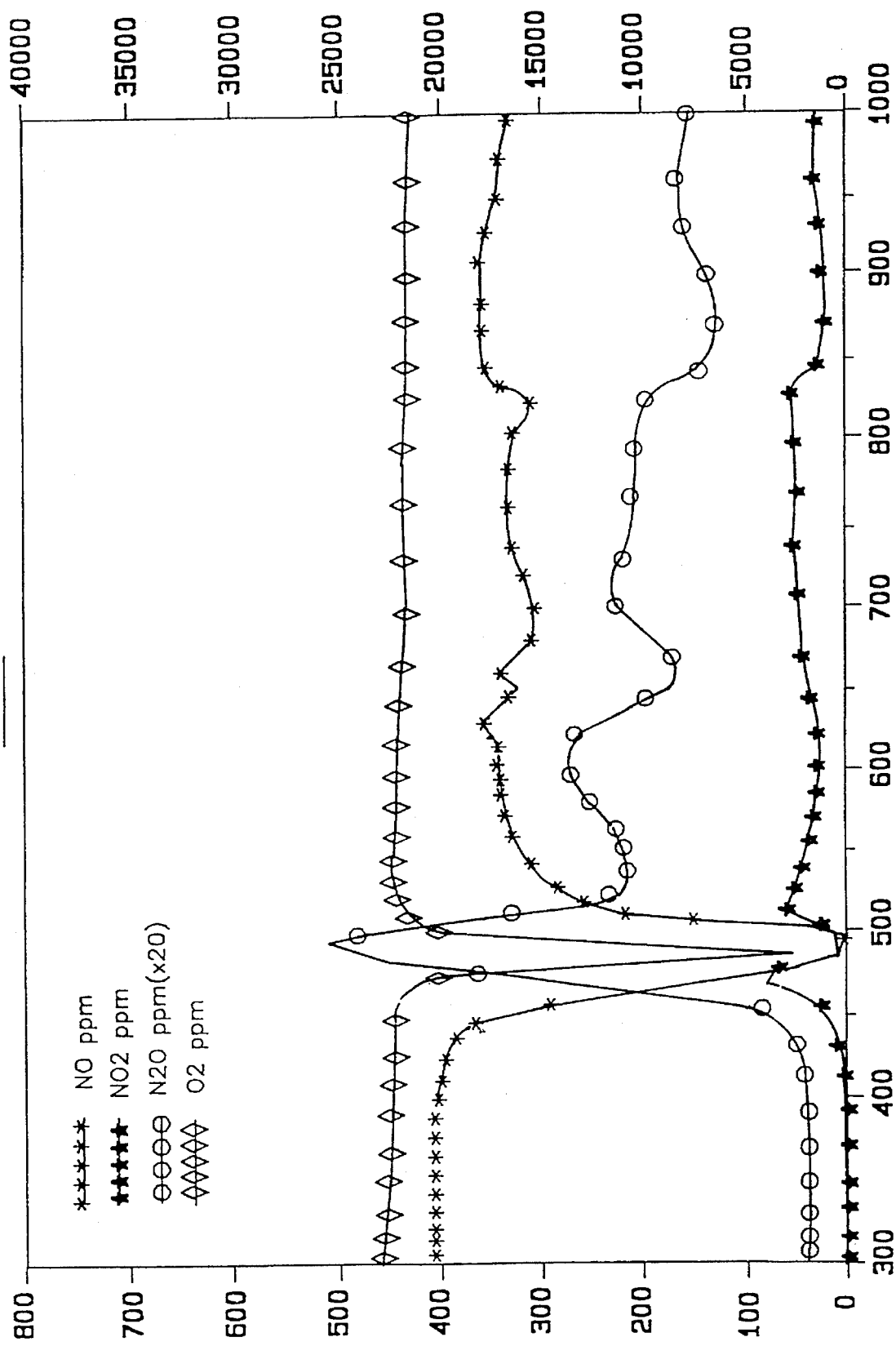

The following examples serve to illustrate the invention. They are explained with reference to FIGS. 1 and 2 of the attached drawings, which are two diagrams indicating the composition of gases containing oxides of nitrogen $NO_x$.

EXAMPLE 1 (REFERENCE EXAMPLE)

A synthetic gas was prepared which consists essentially of argon and nitrogen monoxide [400 μl of nitrogen monoxide (NO) per 1 of gas], but without oxygen. In addition, a bed was prepared of 1 g of sodium pyrosulphite particles on a bed of 5 g of silica resting on a horizontal grid. In the two beds, the particles used had a mean diameter of approximately 100 μm. The gas was passed uniformly upwards through the beds, at a speed regulated in order to fluidize the bed of sodium pyrosulphite.

During the test the temperature in the bed was raised gradually from 300K. to 800K. The results of the test are given in the two diagrams of FIG. 1. In each diagram of FIG. 1, the abscissa represents the temperature of the gas on entering the bed (expressed in kelvins). In the top diagram of FIG. 1, the ordinate represents the volume concentration of each of the components NO, $NO_2$ and $N_2O$ in the gas on leaving the bed (these concentrations being expressed in ppm or µl of component/l of gas and requiring division by 50 in the case of N₂O). In the bottom diagram of FIG. 1, the ordinate represents the volume concentration of SO₂ in the gas (expressed as µl of SO₂/l of gas). It is observed in the diagram of FIG. 1 that, in each of the tests carried out, the gas leaving the bed had approximately the same composition as when entering the bed. At a temperature of 425–430K., the content of sulphur dioxide found in the gas was approximately 3 ml/l, corresponding to the decomposition of the sodium pyrosulphite.

EXAMPLE 2 (IN ACCORDANCE WITH THE INVENTION)

The test of Example 1 was repeated with a synthetic gas consisting of a mixture of argon, nitrogen monoxide (NO) and oxygen and a single and homogeneous bed of 6 g of sodium pyrosulphite. The gas employed on entering the bed had the following composition by volume:

NO: 410 µl/l;

O₂: 22,587 µl/l;

The procedure of Example 1 was followed. The results of the test are reproduced in the diagram of FIG. 2, where the abscissa represents the temperature of the gas on entering the bed (expressed in kelvins), the left-hand ordinate represents the volume concentration of each of the components NO, NO₂ and N₂O in the gas on leaving the bed (these concentrations being expressed in ppm or µl of component per l of gas and requiring division by 20 in the case of N₂O) and the right-hand ordinate represents the volume concentration of oxygen in the gas leaving the bed (expressed in ppm or µl of oxygen per l of gas).

It is observed that the gas has undergone optimum cleaning at temperatures of between approximately 450 and 500K. At a temperature of approximately 480K., the gas leaving the bed had the following composition:

NO: 73 µl/l;

NO₂: 73 µl/l;

N₂O: 7 µl/l;

O₂: 20,000 µl/l.

At a temperature of approximately 500K., the gas leaving the bed had the following composition:

NO: 37 µl/l;

NO₂: 37 µl/l;

N₂O: 10 µl/l;

O₂: 20,000 µl/l.

A comparison of the results of Examples 1 and 2 makes immediately apparent the progress achieved in terms of cleaning to remove nitrogen monoxide by the combination, in accordance with the invention, of the introduction of oxygen into the gas to be cleaned and the subsequent treatment of the latter with sodium pyrosulphite.

What is claimed is:

1. A process for purifying a gas containing nitrogen monoxide to remove nitrogen monoxide therefrom; the process comprising:

a. adjusting oxygen content of the gas to provide a quantity of oxygen which is at least equal to a stoichiometric quantity which is necessary in order to oxidize the nitrogen monoxide contained in the gas to nitrogen dioxide;

b. contacting the gas, substantially in the absence of any liquid, with an alkali metal pyrosulphite which is a solid and which is employed in a quantity sufficient to convert the nitrogen monoxide contained in the gas to alkali metal nitrite and alkali metal nitrate; and c. removing the alkali metal nitrite and the alkali metal nitrate from the gas.

2. The process according to claim 1, wherein the gas additionally contains nitrogen dioxide, and wherein the alkali metal pyrosulphite is employed in a quantity which is sufficient to convert the nitrogen monoxide and the nitrogen dioxide to alkali metal nitrite and alkali metal nitrate.

3. The process according to claim 2, wherein the quantity of alkali metal pyrosulphite employed is more than 0.25 mole of alkali metal pyrosulphite per mole of nitrogen monoxide and nitrogen dioxide in the gas.

4. The process according to claim 3, wherein the quantity of alkali metal pyrosulphite employed ranges from 0.4 to 2.5 mole of alkali metal pyrosulphite per mole of nitrogen monoxide and nitrogen dioxide in the gas.

5. The process according to claim 1, wherein the oxygen content provides a molar ratio of O₂:NO of greater than 1.

6. The process according to claim 6, wherein the oxygen content provides a molar ratio of O₂:NO of at least 8.

7. The process according to claim 6, wherein the oxygen content provides a molar ratio of O₂:NO of greater than 25.

8. The process according to claim 1, wherein the gas has a temperature of greater than 250K.

9. The process according to claim 7, wherein the gas has a temperature which ranges between 450 and 550K.

10. The process according to claim 1, wherein the gas consists of fumes generated by incineration of at least one of household or municipal refuse.

11. A process for purifying a gas containing nitrogen monoxide and sulphur dioxide to remove nitrogen monoxide therefrom, the process comprising:

a. adjusting oxygen content of the gas to provide a quantity of oxygen in the gas which is at least equal to a stoichiometric quantity which is necessary in order to oxidize the nitrogen monoxide contained in the gas to nitrogen dioxide; and b. contacting the gas with an alkali metal compound comprising an alkali metal pyrosulphite, wherein the alkali metal pyrosulfite is employed in a quantity which is sufficient to convert the nitrogen monoxide contained in the gas to alkali metal nitrite and alkali metal nitrate, and wherein the alkali metal pyrosulphite employed is formed in situ within the gas by reacting at least one alkali metal bicarbonate with the sulphur dioxide present in the gas.

12. The process according to claim 11, wherein the gas consists of fumes generated by combustion of a sulphur-containing fossil fuel.

13. The process according to claim 1, wherein the alkali metal is sodium.

* * * * *

UNITED STATES PATENT AND TRADEMARK OFFICE
CERTIFICATE OF CORRECTION

PATENT NO. : 5,464,599
DATED : November 7, 1995
INVENTOR(S) : Gerard De Soete

It is certified that error appears in the above-indentified patent and that said Letters Patent is hereby corrected as shown below:

```
On the title page,
item [30], change "Aug. 30, 1991" to --Sept. 30, 1991--.
```

Signed and Sealed this

Thirtieth Day of January, 1996

*Attest:*

BRUCE LEHMAN

*Attesting Officer*  *Commissioner of Patents and Trademarks*